(12) United States Patent
Fujinawa

(10) Patent No.: US 8,654,238 B2
(45) Date of Patent: Feb. 18, 2014

(54) DIGITAL STILL CAMERA HAVING A MONITOR DEVICE AT WHICH AN IMAGE CAN BE DISPLAYED

(75) Inventor: Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/461,016

(22) Filed: Jul. 29, 2009

(65) Prior Publication Data

US 2009/0303352 A1 Dec. 10, 2009

Related U.S. Application Data

(62) Division of application No. 11/210,706, filed on Aug. 25, 2005, now abandoned.

(30) Foreign Application Priority Data

Sep. 3, 2004 (JP) ................................. 2004-256878
Nov. 19, 2004 (JP) ................................. 2004-335426

(51) Int. Cl.
*H04N 5/222* (2006.01)
(52) U.S. Cl.
USPC ............ 348/333.12; 348/333.01; 348/333.06; 348/333.11
(58) Field of Classification Search
USPC ............. 348/333.01, 333.06, 333.11, 333.12
See application file for complete search history.

(56) References Cited

U.S. PATENT DOCUMENTS

| 6,393,222 | B1 | 5/2002 | Nakagawa et al. | |
|---|---|---|---|---|
| 6,812,967 | B1 * | 11/2004 | Niikawa et al. | 348/333.05 |
| RE40,204 | E * | 4/2008 | Yamamoto | 361/679.27 |
| 7,492,406 | B2 * | 2/2009 | Park et al. | 348/333.05 |
| 7,526,195 | B2 * | 4/2009 | Oh | 396/287 |
| 2001/0005454 | A1 * | 6/2001 | Nishino et al. | 396/287 |
| 2001/0012072 | A1 * | 8/2001 | Ueno | 348/333.02 |
| 2001/0024235 | A1 | 9/2001 | Kinjo | |
| 2001/0043277 | A1 * | 11/2001 | Tanaka et al. | 348/333.01 |

(Continued)

FOREIGN PATENT DOCUMENTS

| EP | 1 458 192 A1 | 9/2004 |
|---|---|---|
| JP | 07-333710 | * 12/1995 |

(Continued)

OTHER PUBLICATIONS

Aug. 4, 2009 European Office Action for European Patent Application No. 05107982.0.

(Continued)

*Primary Examiner* — Antoinette Spinks
(74) *Attorney, Agent, or Firm* — Oliff PLC

(57) ABSTRACT

A digital still camera includes an image-capturing device, a recording device that records a subject image captured by the image-capturing device into an image recording medium, a first monitor device and a second monitor device. The images repeatedly captured by the image-capturing device are displayed in real time at the first monitor device and, at the same time, a photographic support image having been captured by the image-capturing device is displayed at the second monitor device. A single image or a plurality of images recorded in the image recording medium, for instance, may be displayed at the second monitor device as the photographic support image. Alternatively, an image obtained by partially enlarging the image displayed at the first monitor device may be displayed at the second monitor device.

8 Claims, 9 Drawing Sheets

(56) References Cited

U.S. PATENT DOCUMENTS

| | | | |
|---|---|---|---|
| 2002/0171747 A1* | 11/2002 | Niikawa et al. | 348/333.01 |
| 2003/0071904 A1 | 4/2003 | Karasaki et al. | |
| 2004/0042791 A1 | 3/2004 | Suekane et al. | |
| 2004/0125220 A1 | 7/2004 | Fukuda et al. | |
| 2004/0201767 A1* | 10/2004 | Niikawa et al. | 348/333.03 |
| 2004/0223058 A1* | 11/2004 | Richter et al. | 348/207.1 |
| 2006/0210263 A1* | 9/2006 | Oh | 396/287 |
| 2007/0140686 A1* | 6/2007 | Misawa | 396/535 |
| 2008/0231740 A1* | 9/2008 | McIntyre et al. | 348/333.01 |

FOREIGN PATENT DOCUMENTS

| | | |
|---|---|---|
| JP | A-7-333710 | 12/1995 |
| JP | A-11-46316 | 2/1999 |
| JP | A-11-196301 | 7/1999 |
| JP | A-11-266381 | 9/1999 |
| JP | A-11-355620 | 12/1999 |
| JP | A-2001-148799 | 5/2001 |
| JP | A-2001-186396 | 7/2001 |
| JP | A-2001-238115 | 8/2001 |
| JP | A-2001-251540 | 9/2001 |
| JP | A-2002-51250 | 2/2002 |
| JP | A-2002-94625 | 3/2002 |
| JP | A-2003-234933 | 8/2003 |
| JP | A-2003-324632 | 11/2003 |
| JP | A-2004-180021 | 6/2004 |
| JP | A-2005-86283 | 3/2005 |

OTHER PUBLICATIONS

Jan. 23, 2009 European Office Action for European Patent Application No. 0510782.0.
Jul. 21, 2008 European Search Report for European Patent Application No. 05107982.0.
Apr. 24, 2008 European Search Report for European Patent Application No. 05107982.0.
Apr. 1, 2009 U.S. Office Action for U.S. Appl. No. 11/210,706.
Aug. 19, 2008 U.S. Office Action for U.S. Appl. No. 11/210,706.
Jan. 26, 2010 U.S. Office Action for Japanese Patent Application No. 2004-335426 (with translation).

* cited by examiner

DIGITAL STILL CAMERA HAVING A MONITOR DEVICE AT WHICH AN IMAGE CAN BE DISPLAYED

INCORPORATION BY REFERENCE

This is a Divisional of application Ser. No. 11/210,706 filed Aug. 25, 2005. The disclosure of the prior application is hereby incorporated by reference herein in its entirety. This application claims the benefit of the following priority applications and the entire disclosures of which are herein incorporated by reference herein in their entirety:
Japanese Patent Application No. 2004-256878 filed Sep. 3, 2004
Japanese Patent Application No. 2004-335426 filed Nov. 19, 2004

BACKGROUND OF THE INVENTION

1. Field of the Invention

The present invention relates to a digital still camera having a monitor device at which an image can be displayed.

2. Description of Related Art

A liquid crystal monitor disposed at the rear surface of the body of a digital still camera may be utilized as a viewfinder by displaying in real time at the liquid crystal monitor subject images captured repeatedly by an image-capturing element. In this type of camera, an image that has been captured and recorded previously may also be displayed at the liquid crystal monitor by selecting a replay mode.

Japanese Laid Open Patent Publication No. 2002-94625 discloses a cellular phone capable of photography, which includes two liquid crystal monitors.

However, the two monitors disclosed in the publication are not utilized to facilitate a subsequent photographing operation or to provide better convenience in the replay mode that may be subsequently selected.

SUMMARY OF THE INVENTION

A digital still camera according to a first aspect of the present invention includes an image-capturing device; a recording device that records a subject image captured by the image-capturing device into an image recording medium; a reproducing device that reproduces a subject image recorded in the image recording medium; a first monitor device; a second monitor device; and a display control device that displays the subject image captured by the image-capturing device at the first monitor device and displays at the second monitor device an image other than the image displayed at the first monitor device.

In the digital still camera according to the first aspect, it is preferable that the display control device displays in real time at the first monitor device subject images repeatedly captured by the image-capturing device simultaneously as the display control device displays at the second monitor device a photographic support image having been captured by the image-capturing device. It is preferable that the photographic support image displayed at the second monitor device is the subject image reproduced by the reproducing device. A plurality of subject images reproduced by the reproducing device may be displayed at the second monitor device as the photographic support image.

In the digital still camera according to the first aspect, it is preferable that the display control device displays at the first monitor device the subject image reproduced by the reproducing device simultaneously as the display control device displays at the second monitor device one of an image related to the subject image displayed at the first monitor device and an image to be used to aid selection of an image to be displayed at the first monitor device.

In the digital still camera according to the first aspect, it is preferable that the image displayed at the second monitor device is an enlarged image of part of the subject image displayed at the first monitor device. It is preferable that the enlarged image on display contains a focus area of the subject image displayed at the first monitor device. The display control device may display at the first monitor device a frame indicating an area displayed as the enlarged image over the subject image.

In the digital still camera according to the first aspect, it is preferable that the image displayed at the second monitor device is an image created by executing white balance adjustment processing on the subject image displayed at the first monitor device. A selection device that selects an image displayed at the second monitor device may be further provided, and it is possible that the display control device displays a plurality of images corresponding to varying white balance settings at the second monitor device and as one image among the plurality of images is selected through the selection device, the display control device uses the white balance setting of the selected image in a subsequent photographing operation or in data of the subject image displayed at the first monitor device.

In the digital still camera according to the first aspect, a selection device that selects an image displayed at the second monitor device may be further provided, and it is also possible that the display control device displays a plurality of thumbnail images reproduced by the reproducing device at the second monitor device and as one image among the plurality of thumbnail images on display is selected through the selection device, the display control device displays a subject image corresponding to the selected thumbnail image over a screen of the first monitor device.

In the digital still camera according to the first aspect, it is preferable that the display control device displays in real time at the first monitor device subject images repeatedly captured by the image-capturing device or displays at the first monitor device an image reproduced by the reproducing device simultaneously as the display control device displays at the second monitor device information indicating at least one of characteristics of the subject image displayed at the first monitor device and photographing conditions under which the subject image displayed at the first monitor device has been photographed. The information displayed at the second monitor device may contain a histogram indicating a brightness distribution in the subject image displayed at the first monitor device.

In the digital still camera according to the first aspect, it is preferable that one of the first monitor device and the second monitor device includes a display screen that turns to a desired angle and by adjusting the angle of the display screen, a display screen of the first monitor device and a display screen of the second monitor device are aligned next to one another so as to be viewed simultaneously. By adjusting the angle of the display screen, the display screen of the first monitor device and the display screen of the second monitor device may be set in a closed state in which the display screens face opposite each other so as to conceal each other. The digital still camera according to the first aspect may further includes a detection device that detects whether the first monitor device and the second monitor device have an angular relationship that allows an operator to view the first monitor device and the second monitor device simultaneously, and if detection results provided by the detection device indicate that the first monitor device and the second monitor device do not have the angular relationship which allows the first monitor device and the second monitor device to be viewed simultaneously, the display control device may turn off one of the first monitor device and the second monitor device.

A digital still camera according to a second aspect of the present invention includes an image-capturing device; a recording device that records a subject image captured by the image-capturing device into an image recording medium; a first monitor device; a second monitor device; and a display control device that displays in real time subject images repeatedly captured by the image-capturing device at a display screen of the first monitor device and also at a display screen of the second monitor device when the display screen of the first monitor device is turned toward a photographer and the display screen of the second monitor device is turned toward a photographic subject.

A digital still camera according to a third aspect of the present invention includes an image-capturing device; a recording device that records a subject image captured by the image-capturing device into an image recording medium; a first monitor device; a second monitor device; and a display control device that displays in real time at a display screen of the first monitor device subject images repeatedly captured by the image-capturing device and brings up a countdown display of a self timer at a display screen of the second monitor device when the display screen of the first monitor device is turned toward a photographer and the display screen of the second monitor device is turned toward a photographic subject in a self timer mode.

DESCRIPTION OF PREFERRED EMBODIMENT

An embodiment of the present invention is now explained in reference to FIGS. 1 through 14.

Figure 1:
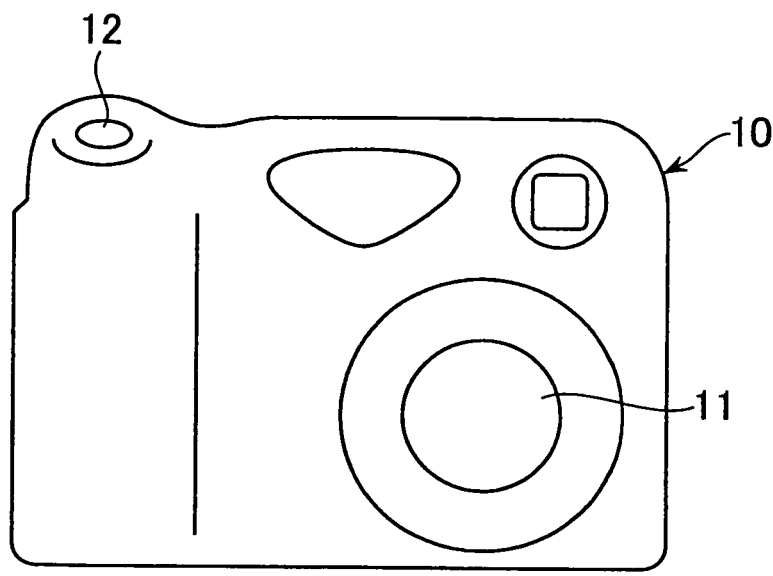
FIG. 1 is a front view of a digital still camera achieved in an embodiment of the present invention.
Figure 2:
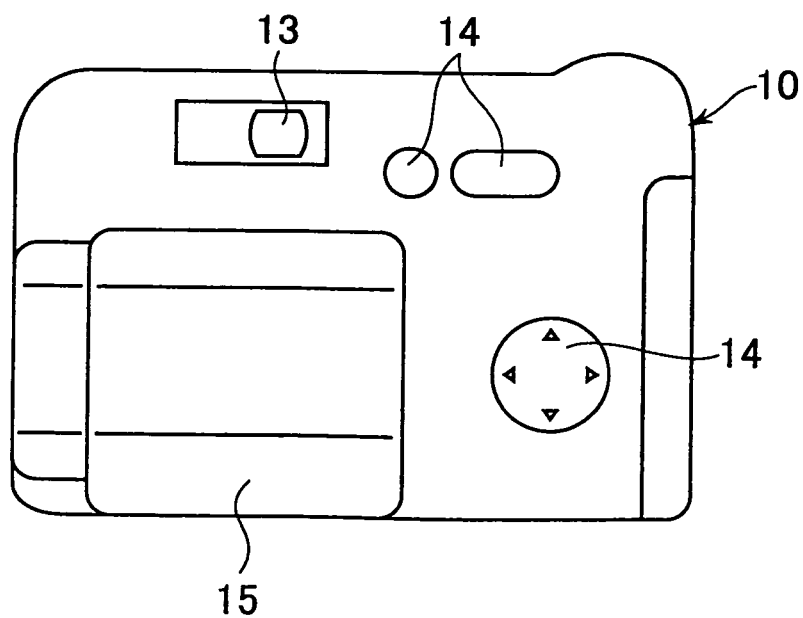
FIG. 2 provides a rear view of the digital still camera with its flip-out monitor in a closed state.
Figure 3:
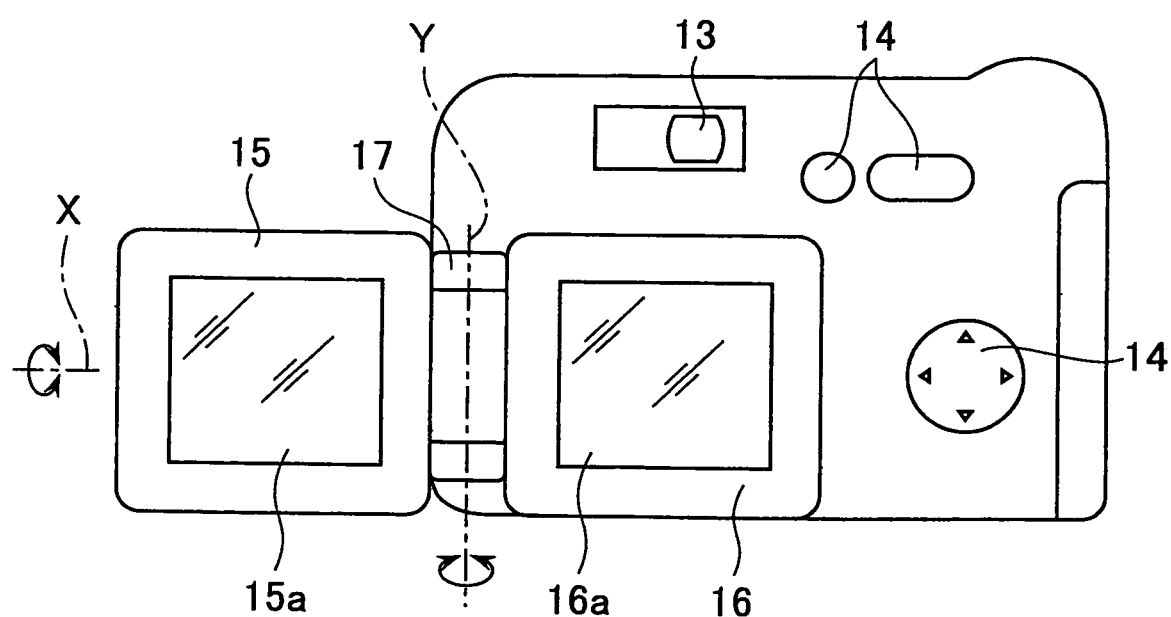
FIG. 3 is a rear view similar to that provided in FIG. 2 with the flip-out monitor in an open state.

FIGS. 1 to 3 provide front view and rear views of a digital still camera achieved in the embodiment. A photographic lens 11 is disposed at the front surface of a camera body 10 and a shutter release button 12 is disposed at the top surface of the camera body 10. In addition, at the rear surface of the camera body 10, a flip-out color liquid crystal monitor 15 and a fixed color liquid crystal monitor 16 are disposed, in addition to a viewfinder eyepiece unit 13 and a plurality of operating members 14. The monitors 15 and 16 respectively include rectangular liquid crystal screens 15a and 16a having substantially equal dimensions.

The flip-out monitor 15 is a free angle monitor, which is allowed to rotate via hinge portions 17 relative to an axis (a Y axis) extending through the top and the bottom of the camera and is also allowed to rotate relative to an X axis extending perpendicular to the Y axis. Accordingly, as the flip-out monitor 15 rotates around the X axis and the Y axis, the orientation of the screen 15a can be adjusted freely. The fixed monitor 16, on the other hand, is fixed at the rear surface of the camera, and its screen 16a is thus always set on the rear surface toward the photographer.

When the flip-out monitor 15 is in a closed state, as shown in FIG. 2, the screen 15a is placed over the screen 16a of the fixed monitor 16 and the two screens 15a and 16a are both concealed. In FIG. 3 showing the flip-out monitor 15 having been opened by approximately 180° around the Y axis, the two screens 15a and 16a are exposed, one set next to the other along the horizontal direction.

Figure 4:
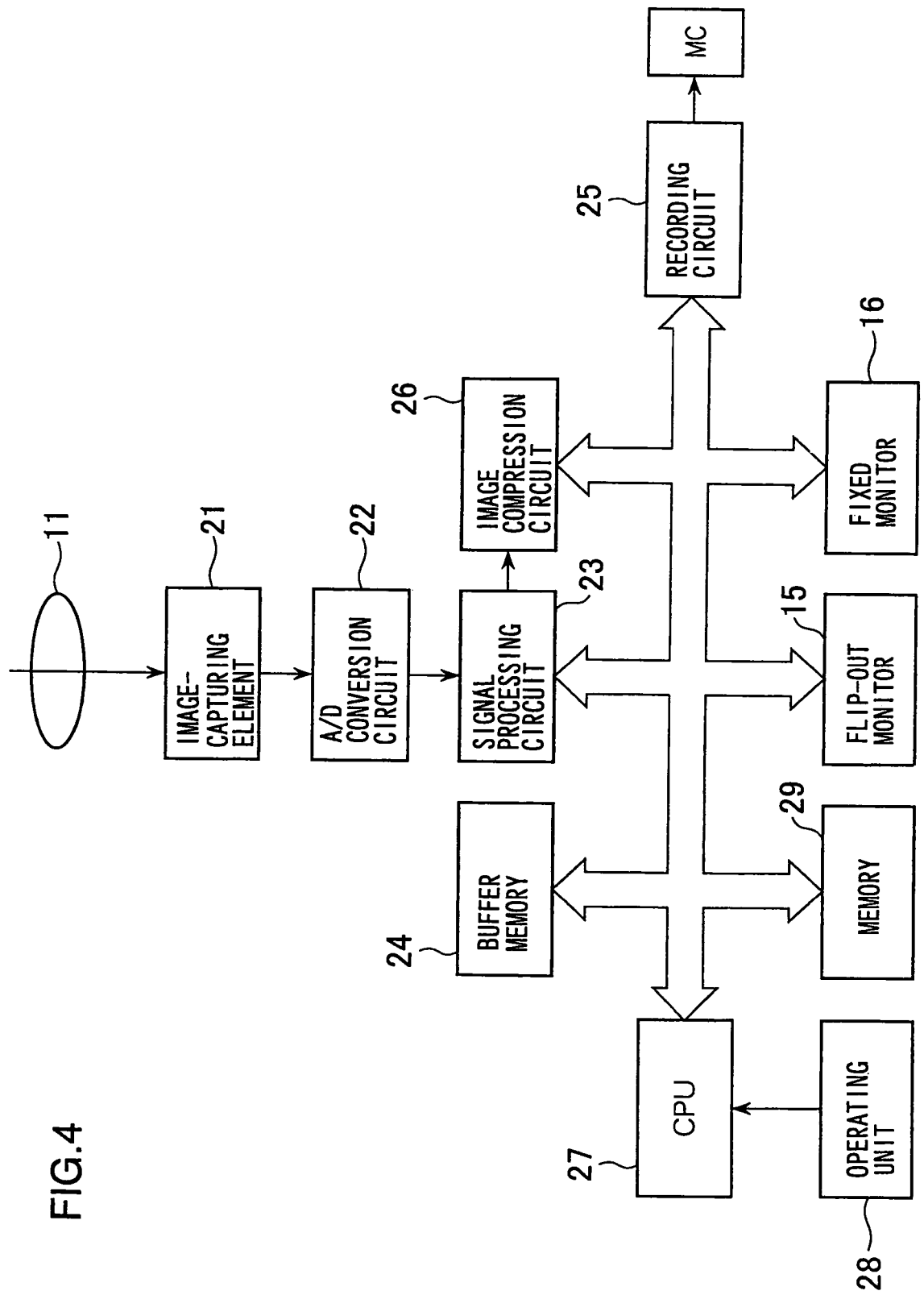
FIG. 4 is a block diagram of a camera control system.

FIG. 4 is a block diagram of a control system of the digital still camera. A subject light flux having been transmitted through the photographic lens 11 forms an image at a light receiving surface of an image-capturing element (image-capturing device) 21 constituted with a CCD or the like, and the image-capturing element 21, in turn, outputs an electrical signal (image capturing signal) corresponding to the light intensity of the subject image having been formed. The image capturing signal is then converted to a digital signal at an A/D converter 22 and then undergoes various types of image processing at a signal processing circuit 23.

Image data resulting from the signal processing are stored into a buffer memory 24 and these are recorded into a memory card MC via a recording circuit 25. When the image data are recorded, they are compressed as necessary in a predetermined compression format at an image compression circuit 26. The various circuits described above are all controlled by a CPU 27.

In addition to the screens 15a and 16a, the flip-out monitor 15 and the fixed monitor 16 each include a liquid crystal drive unit, a backlight, a backlight control unit and the like. The CPU 27 issues instructions to the liquid crystal drive units and the backlight control units in response to which images are displayed based upon image data and other types of information are displayed at the screens 15a and 16a. Image display modes include a display mode in which subject images repeatedly captured at the image-capturing element 21 are displayed in real time (hereafter referred to as a through image display mode) and a display mode in which an image recorded in the memory card MC is read out and displayed (hereafter referred to as a reproduced image display mode).

It is to be noted that an operating unit 28, which includes the shutter release button 12 and the operating members 14 described earlier, and a memory 29 such as a ROM or a RAM in which information used when implementing the control is stored are connected to the CPU 27.

Next, an explanation is given on photographic support functions achieved by using the flip-out monitor 15 and the fixed monitor 16. The camera has all the functions (1) through (6) explained below, and the photographer is allowed to select a desired function through, for instance, custom setting. Alternatively, the camera may automatically select a specific function based upon a judgment made with regard to the current operating conditions.

Figure 5:
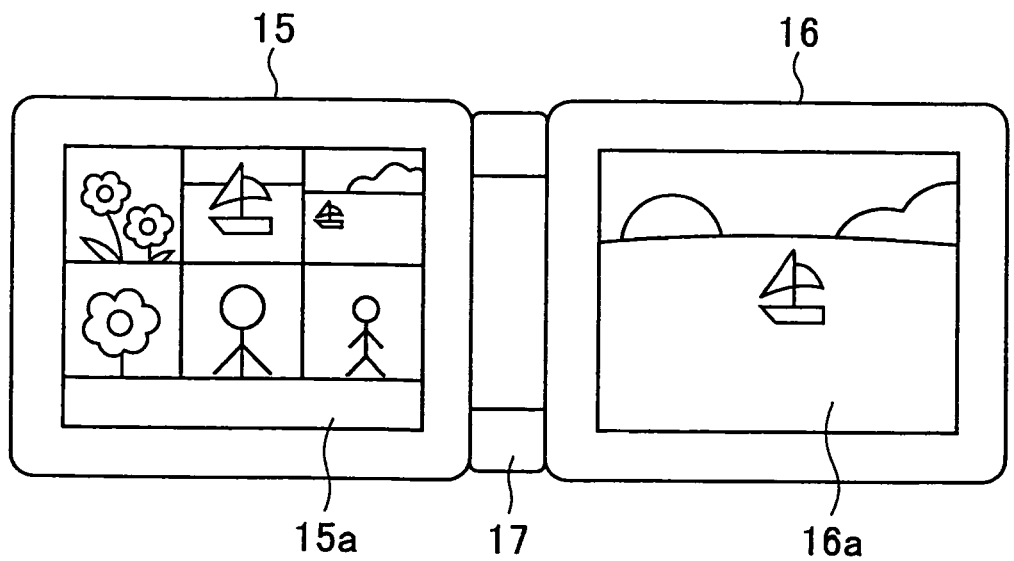
FIG. 5 presents an example of simultaneous display of through image/reproduced images.

(1) Simultaneous Display of Through Image/Reproduced Images (See FIG. 5)

In a regular photographing mode, the CPU 27 brings up the through image display described above at the fixed monitor 16 and also brings up a reproduced image display at the flip-out monitor 15. The reproduced image display is a thumbnail display, and if there is a plurality of images having already been recorded, the plurality of images are displayed by splitting the screen. While the photographer determines the composition by viewing the through image at the screen 16a, he is able to check the plurality of images having already been photographed (having already been recorded) on display close-by at the screen 15a at all times. Thus, he is able to decide on a specific composition with ease by taking into consideration the compositions of the images having already been photographed. For instance, he may decide to try a different composition from those of the images having already been photographed or he may decide to photograph several more images with a composition he particularly likes. When the flip-out monitor 15 is opened by 180° in particular, the two screens 15a and 16a are set side-by-side on a substantially single plane, namely, they are aligned next to one another, which allows the two screens to be viewed together with ease. However, the open angle does not need to be exactly 180°.

Once the composition is determined, the image can be photographed simply by operating the shutter release button 12 and the photographed image is recorded into the memory card MC through the procedure explained earlier. It is desirable that once the image is recorded, the thumbnail image display at the screen 15a be updated so that the latest recorded images are displayed at all times.

It is to be noted that if the user of an existing camera having only a single monitor wishes to check recorded images when deciding on a composition, he needs to first switch from the photographing mode to the replay mode and then he needs to reselect the photographing mode after checking the reproduced images. This procedure is time-consuming and moreover, since the through image is not displayed while the reproduced image display is up, the user cannot make a comparison by viewing the reproduced images and the through image at the same time. For this reason, the composition cannot be determined with ease and in some cases, he may have to switch between the photographing mode and the replay mode several times.

Figure 6:
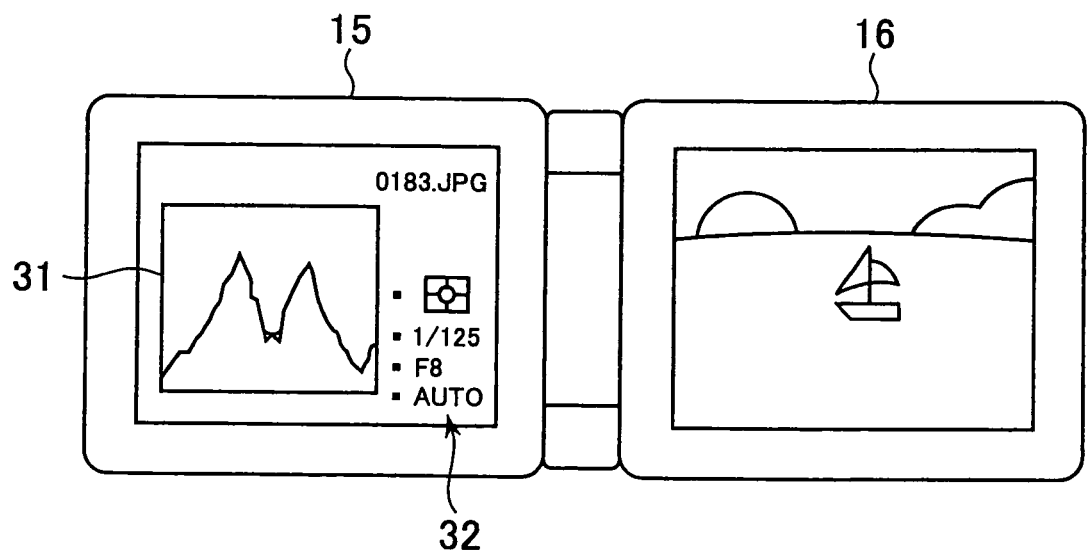
FIG. 6 presents an example of simultaneous display of through image/histogram.

(2) Simultaneous Display of Through Image/Histogram (See FIG. 6)

A histogram of an image indicates the brightness distribution in the image in a graph as image characteristics. The image histogram normally indicates the brightness along the horizontal axis and the frequency along the vertical axis. The graph reflects the exposure value set in the camera, and the center of the graph shifts further to the left if the image is under-exposed and shifts further to the right if the image is over-exposed. Accordingly, a real-time display of the histogram of the through image allows the photographer to correct the exposure by checking the state of the histogram so as to minimize the occurrence of under-exposure or over-exposure (in particular blackouts or whiteouts).

When this function is selected, the through image display is brought up at the fixed monitor 16 and, at the same time, a real-time display of the histogram of the through image is brought up at the flip-out monitor 15. Reference numeral 31 in FIG. 6 indicates the histogram display. By selecting this function, the histogram can be displayed over a large display area while keeping the through image intact and without having to display the through image in a reduced form, and thus, the optimal exposure can be selected smoothly without affecting the process of decision-making with regard to the composition. As reference numeral 32 indicates, the photographing conditions such as the file mode, the aperture value and the shutter speed and other information may be displayed in addition to the histogram.

It is to be noted that in an existing camera having only a single monitor, the histogram is displayed over part of the image or in a blank area created by reducing the image. In either case, the image is not as easy to view, which makes it more difficult to determine the composition. In addition, the histogram on display is smaller and not as easy to read.

Figure 7:
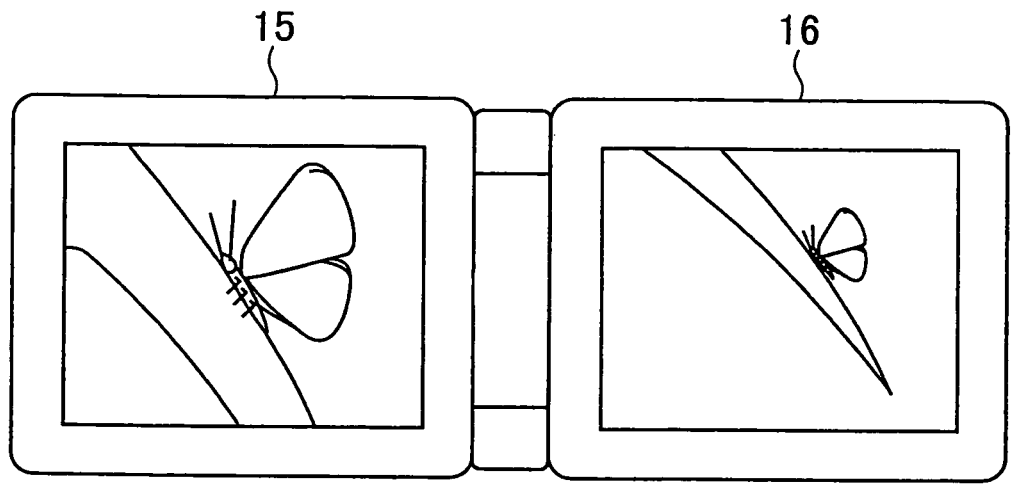
FIG. 7 presents an example of simultaneous display of through image/enlarged image.

(3) Simultaneous Display of Through Image/Enlarged Image (See FIG. 7)

Since a liquid crystal monitor is normally a compact unit with a relatively small number of pixels, it is difficult to verify the focus state simply by viewing the through image. Accordingly, this function is selected so as to simultaneously bring up the through image display at the fixed monitor 16 and a display of an enlarged image of an area around a focus area in the through image at the flip-out monitor 15. The term "area around a focus area" refers to an area containing the focus area at the center thereof within the image plane (containing a selected focus area if there is a plurality of focus areas). The CPU 27 engages a focal adjustment device (not shown) to execute a focal adjustment in the area and also brings up the display of the enlarged image of the area around the focus area explained above at the flip-out monitor 15. The display of the enlarged image facilitates verification of the focus state (whether or not the image is focused) even with the liquid crystal monitor, and thus, defocusing can be prevented. Since the entire through image is concurrently displayed at a separate screen, the process of composition decision-making is not affected at all.

Figure 8:
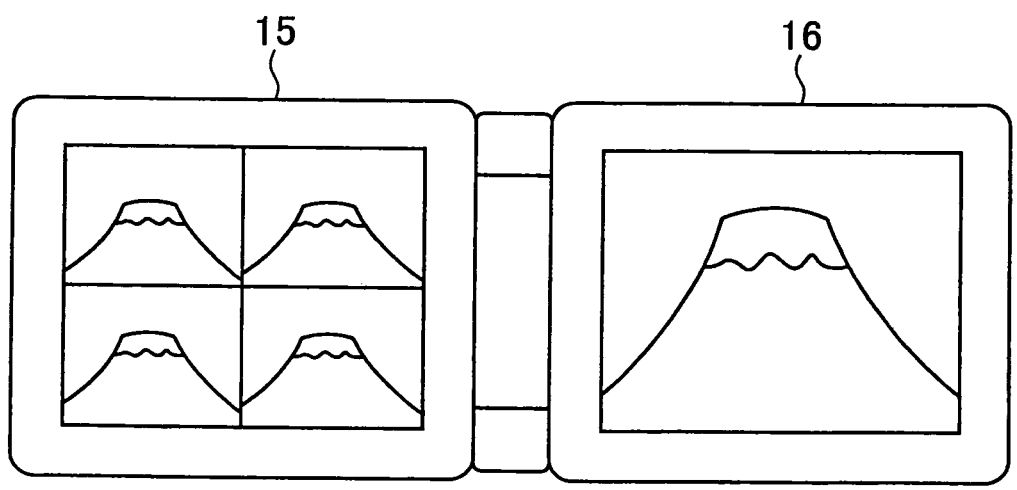
FIG. 8 presents an example of simultaneous display of through image/WB variations.

(4) Simultaneous Display of Through Image/WB Variations (See FIG. 8)

Under normal circumstances, a digital still camera allows white balance adjustment (WB) and the adjustment is executed through menu selection. While the color tone of the image is altered through white balance adjustment, the exact results can only be verified after the adjustment is actually executed. For this reason, the photographer needs to have a great deal of experience to be able to produce an image in the exact color tone he desires. Accordingly, this function is selected to bring up the through image display at the fixed monitor 16 and, at the same time, a plurality of through images in reduced size in correspondence to varying white balance settings are displayed at the flip-out monitor 15. The photographer is then able to select via an operating member 14 the most desirable image (e.g., the image that is the closest in color tone to the actual subject) among the reduced images. Once the selection is made, the CPU 27 sets the white balance of the selected image as the white balance setting for the photographing operation. Namely, the white balance setting of the selected image is used in subsequent photographing operations. This function allows even a novice photographer to take pictures in desired color tones with ease.

While the through image is displayed at the fixed monitor 16 and a photographic support display is brought up at the flip-out monitor 15 in each of the functions (1) through (4) described above, the through image display and the photographic support display may be respectively brought up at the flip-out monitor 15 and the fixed monitor 16, instead. In addition, the photographer may be allowed to select the monitor at which the through image is to be displayed as well.

Figure 9:
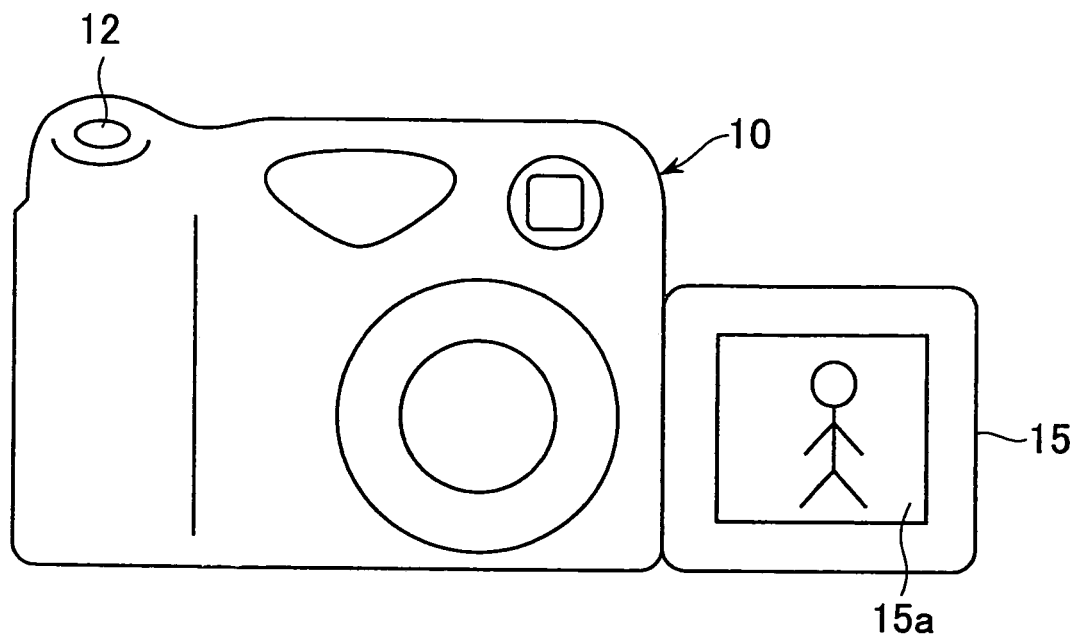
FIG. 9 presents an example of a bidirectional display of a through image.

(5) Bidirectional Display of Through Image (See FIG. 9)

When this function is selected, a given through image is displayed both at the flip-out monitor 15 and the fixed monitor 16. As explained earlier, the flip-out monitor 15 is allowed to assume any angular position. Accordingly, by rotating the monitor 15 around the X axis in the state shown in FIG. 3, the screen 15*a* can be turned toward the subject. By selecting this function when the screen is turned toward the subject, the through image can be checked by both the subject, i.e., the person being photographed, and the photographer. The photographic subject is able to decide on the optimal facial expression or posture by checking the through image and is also able to make a specific request with regard to the composition. This establishes a completely new photographing concept that allows more active participation of the photographic subject as well as the photographer in the photographing operation.

Figure 10:
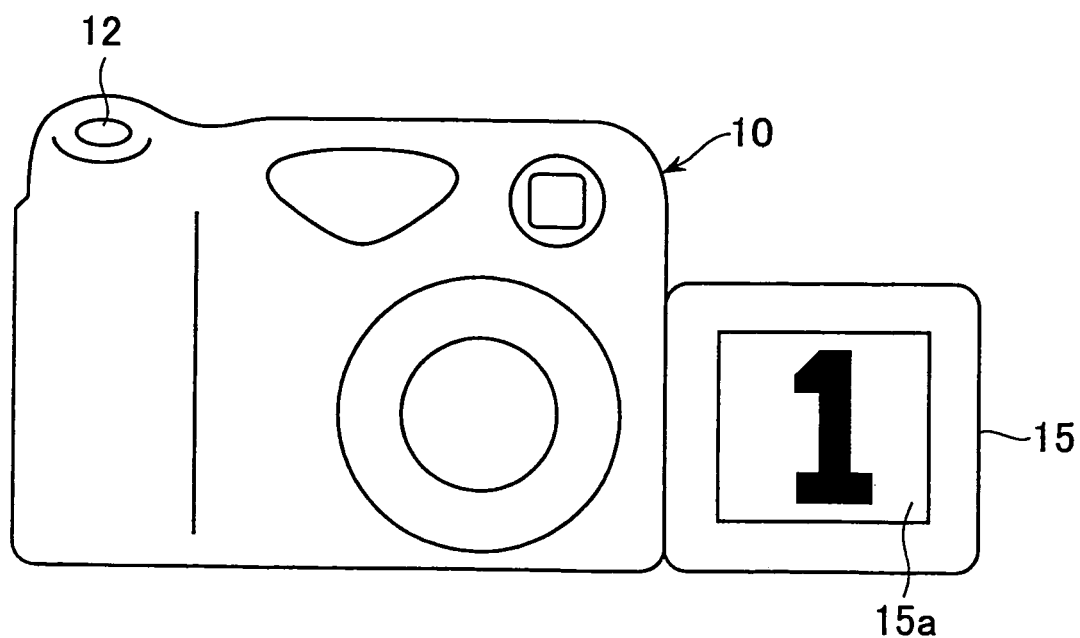
FIG. 10 presents an example of simultaneous display of through image/countdown.

(6) Simultaneous Display of Through Image/Countdown (See FIG. 10)

When this function is selected, the through image display is brought up at the fixed monitor 16 and the self timer countdown is displayed at the flip-out monitor 15 in a self timer mode. The self timer countdown display can be viewed from the photographic subject side if the screen 15*a* of the monitor 15 is turned toward the subject. For instance, if the camera is set to take the picture in five seconds following the shutter release operation, the countdown display may indicate numerals in the order of "5"→"4"→ . . . →"1"→"0" and a photograph is taken at "0". With large numerals displayed at the screen 15*a*, the photographic subject can know when the shutter will actually be released. This function allows the photographic subject to be ready for the shutter release and, as a result, the photographic subject is never caught unawares when the picture is taken. It is desirable that this function be automatically selected as the camera is set in the self timer mode.

If the camera is set in a mode (e.g., a multiple self timer function), in which a plurality of pictures are taken on the self timer in response to a single operation, a message such as "another picture" may be brought up during the interval between the individual photographing operations and the countdown display may then be brought up again. In addition, since the display at the fixed monitor 16 is less likely to be visually checked during a self timer photographing operation, a function of automatically turning off the fixed monitor 16 may be made available.

It is to be noted that in addition to the functions (1) through (6) described above, additional functions of displaying, for instance, instructions on the camera use or map information at one of the monitors may be provided.

While examples of displays that may be brought up in the regular photographing mode have been explained earlier, displays that may be brought up in the replay mode are now explained.

When the camera is switched from the photographing mode to the replay mode, an image having already been recorded in the memory card MC can be read out and displayed at a monitor screen (reproduced image display). The image files having been recorded in the memory card MC each contain a thumbnail image in addition to the main image, and in general, a plurality of thumbnail images are simultaneously displayed at the screen and once one of the thumbnail images is selected, the main image corresponding to the selected thumbnail image is displayed over the entire screen.

The following display functions (7) through (11) are available in the replay mode in the camera achieved in the embodiment. The photographer may be allowed to select a desired function through, for instance, custom setting.

(7) Simultaneous Display of Reproduced Image/Photographic Information

When this function is selected, a reproduced image (main image) is displayed at one of the monitors with information related to the reproduced image displayed at the other monitor. The information related to the reproduced image includes the photographing conditions such as the file mode, the aperture value and the shutter speed as well as the histogram. Such information saved together with the image in an Exif format is read out and displayed. Other types of information are also saved as the Exif information, and thus, it will be convenient to handle all types of information as display options and allow whichever type of information that is selected to be displayed. Alternatively, several types of information which are preselected may be brought up on display. If the reproduced image is brought up at the fixed monitor 16 and the information is brought up on display at the flip-out monitor 15, the monitors may provide displays similar to those in FIG. 6, for instance. However, while the image displayed at the fixed monitor 15 is a through image in FIG. 6, a reproduced image will be displayed at the fixed monitor 16 when this function is selected.

It is to be noted that in an existing camera having only a single monitor, an image and information related to the image can be displayed simultaneously only by displaying the information over the image, which makes it harder to view both the image and the information. In contrast, the image and the information are displayed simultaneously at separate positions in the embodiment, and thus, both the image and the information can be viewed with ease.

Figure 11:
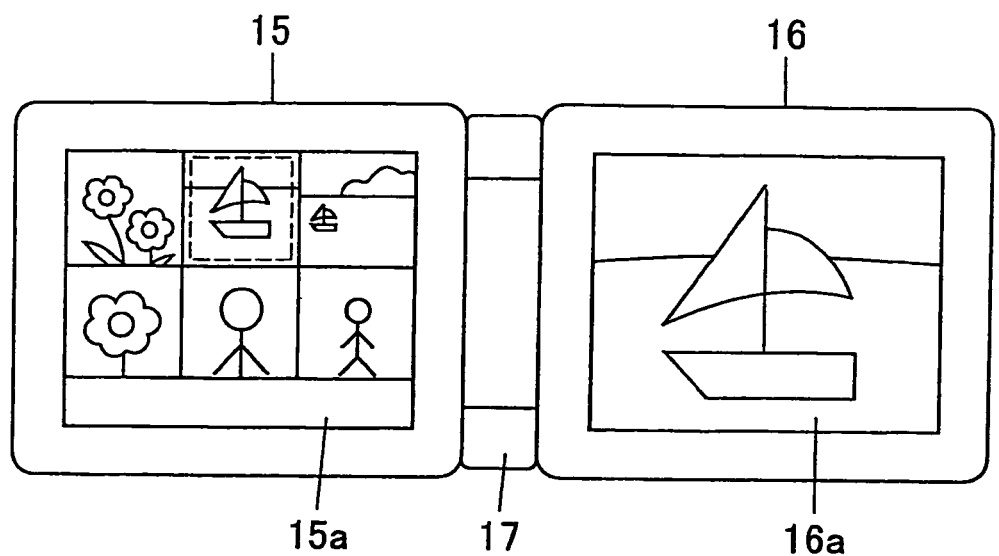
FIG. 11 presents an example of simultaneous display of main image/thumbnails that may be brought up in the replay mode.

(8) Simultaneous Display of Main Image/Thumbnails (See FIG. 11)

When this function is selected, one of the monitors is exclusively used for main image display and the other monitor is exclusively used for thumbnail display in the replay mode. FIG. 11 shows an example in which the main image display is brought up at the fixed monitor 16 and the thumbnail display is brought up at the flip-out monitor 15. As a specific image among the thumbnail images on display at the flip-out monitor 15 is selected, the main image corresponding to the selected thumbnail image is brought up on display at the fixed monitor 16. Since this function allows the thumbnail display to remain on while the main image is brought up on display, the next image for display can be selected quickly.

It is to be noted that an existing camera having only a single monitor necessitates that the thumbnail display be turned off once an image is selected for display to allow the main image display to be brought up and thus, the display needs to be switched back to the thumbnail display when the next image for display is to be selected, which compromises the operability.

Figure 12:
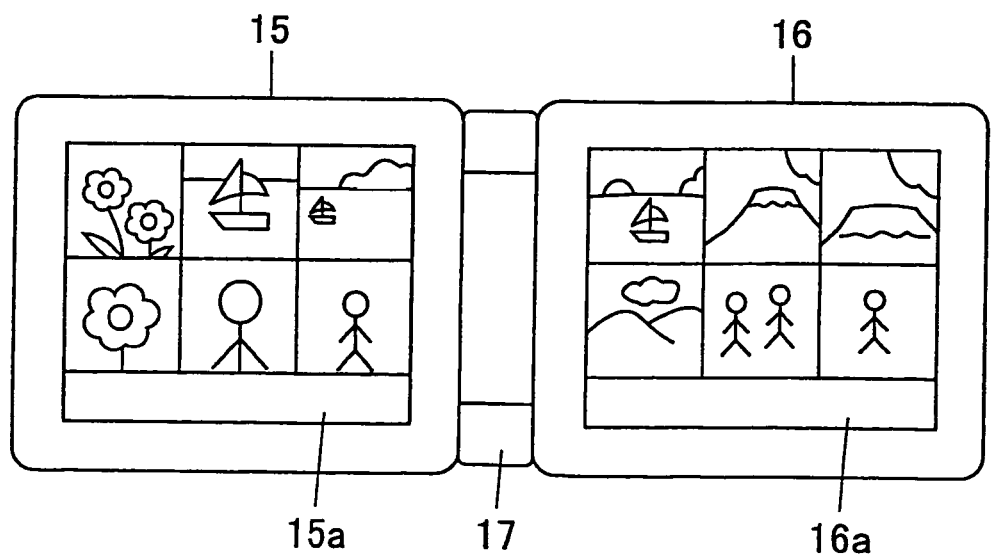
FIG. 12 presents an example of a double-screen display of thumbnails that may be brought up in the replay mode.

(9) Double-Screen Display of Thumbnails (See FIG. 12)

When this function is selected, thumbnail images are displayed at both monitors 15 and 16. While only up to 3×3=9 thumbnail images can be displayed at an existing camera, two screens are used with 9 thumbnail images displayed at each so as to enable display of a total of 18 thumbnail images. Since a greater number of options can be simultaneously displayed for image selection, the process of image selection is facilitated. Once an image is selected, either of the monitors is switched from the thumbnail display to a display of the selected image (main image).

Figure 13:
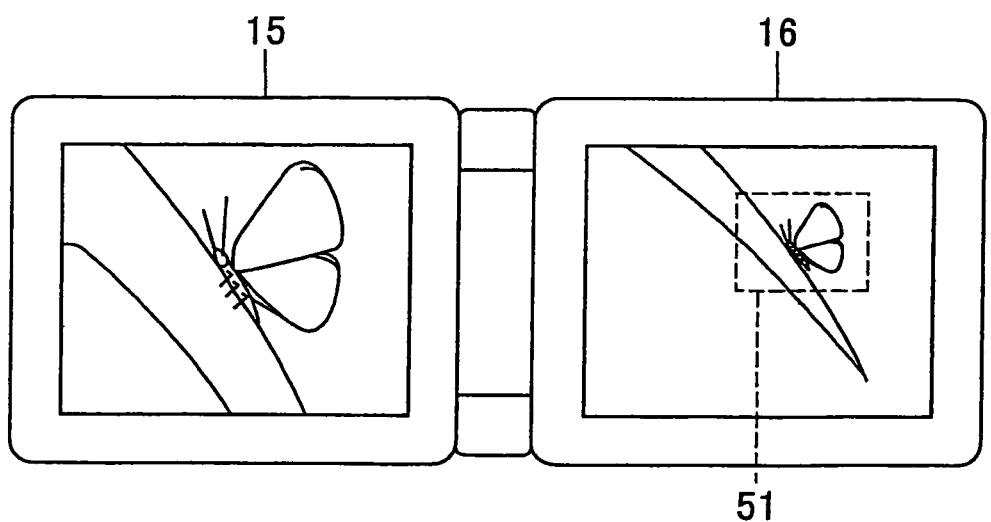
FIG. 13 presents an example of simultaneous display of main image/enlarged image that may be brought up in the replay mode.
Figure 14:
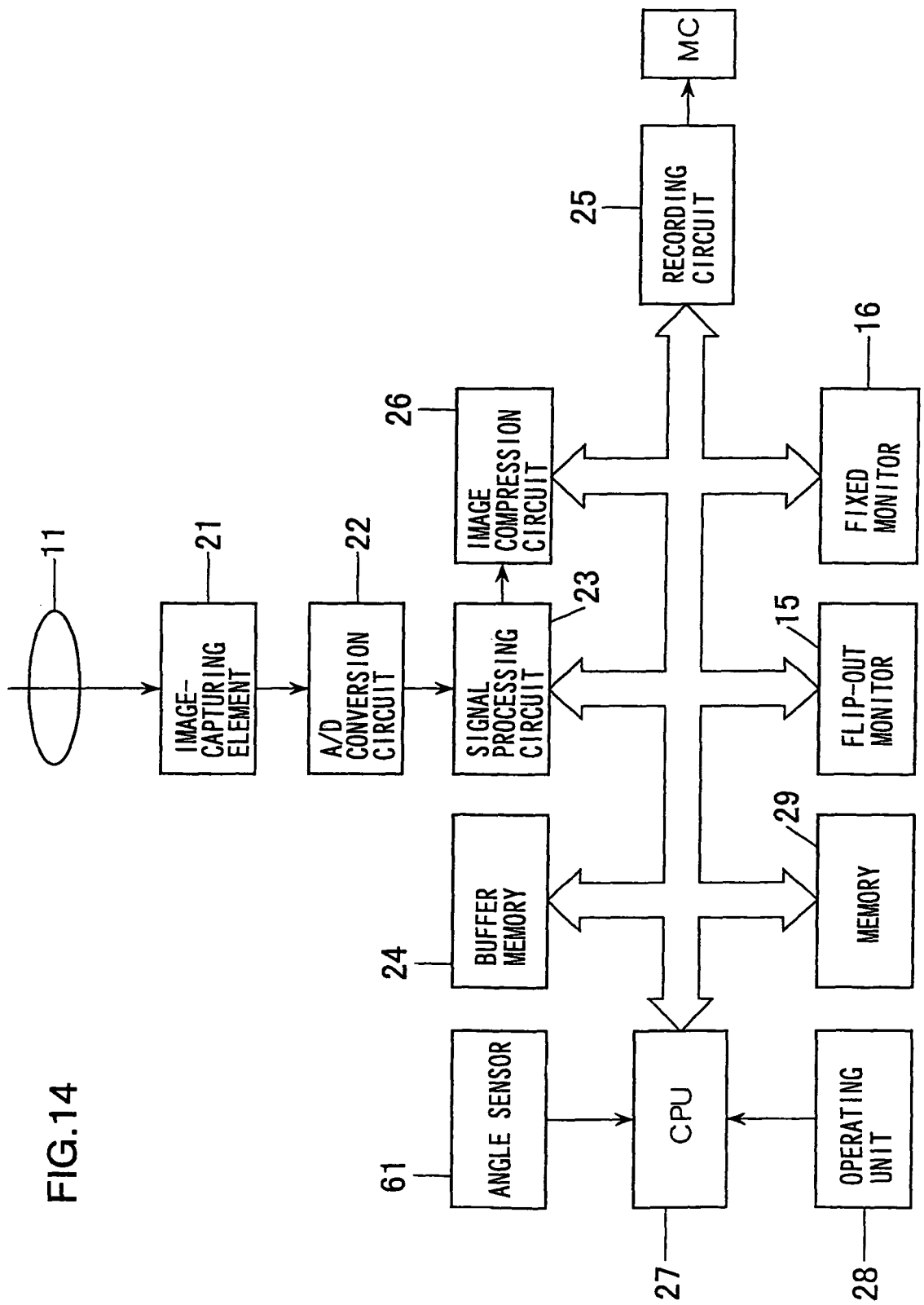
FIG. 14 is a block diagram of control achieved by incorporating an angle sensor.

(10) Simultaneous Display of Main Image/Enlarged Image (See FIG. 13)

When this function is selected, the main image having been selected in the thumbnail display is brought up on display at the standard magnification factor at one of the monitors and an enlarged image of a portion of the main image is displayed at the other monitor. FIG. 13 presents a display example in which the main image is displayed at the fixed monitor 16 and the enlarged image is displayed at the flip-out monitor 15, with lines 51 framing the area corresponding to the enlarged display superimposed on the main image. This allows the photographer to ascertain with ease which part of the main image is currently displayed as the enlarged image. While it is necessary to switch one of the monitors back to the thumbnail display when selecting the next image, it is not necessary to reset the magnification factor of the enlarged image to the standard magnification factor. It is to be noted that the frame lines 51 may be allowed to move within the screen in response to a specific operation so as to alter the image area for enlargement, i.e., the image displayed at the flip-out monitor 15, by interlocking with the movement of the frame lines 51.

It is to be noted that as an instruction for image enlargement is issued in an existing camera having only a single monitor, the enlarged image is displayed in place of the main image having been displayed at the standard magnification factor and thus, the two images cannot be viewed at the same time. For this reason, it is not as easy to ascertain the exact portion of the main image that is enlarged. In addition, since it is necessary to switch from the enlarged image display back to image display at the standard magnification factor when selecting the next image, the operability is poor.

(11) Simultaneous Display of the Main Image/WB Variations

When this function is selected, the main image having been selected is brought up on display at one of the monitors and a plurality of thumbnail images of the main image, each corresponding to one of various white balance settings, are concurrently brought up on display at the other monitor. For instance, the main image may be displayed at the fixed monitor 16, as shown in FIG. 8. However, while the image displayed in FIG. 8 is the through image, the image displayed when this function is selected is a reproduced image. As an image with a desired white balance setting is selected from the thumbnails displayed at the flip-out monitor 15, the image data undergo digital processing so as to reflect the white balance setting in the main image. This function allows the white balance of the photographed image to be adjusted on the camera.

The functions (7) to (11) explained above each bring up a reproduced image of the main image on display at the fixed monitor 16 and brings up an image related to the main image displayed at the fixed monitor 16 or images used to aid in the selection of an image to be displayed at the fixed monitor 16 on display at the flip-out monitor 15. However, the reproduced image and the related image or the aiding images may be respectively displayed at the flip-out monitor 15 and the fixed monitor 16, instead. In addition, the photographer may be allowed to select the monitor at which the main image is to be displayed.

While an explanation is given above on functions that may be selected when the two monitors are utilized at the same time, it is desirable to make available options of using the two monitors concurrently and using only one of the monitors, as in the related art, so as to minimize power consumption. In addition, one of the monitors may automatically go off if the remaining battery power becomes lower than a predetermined level. Furthermore, if the flip-out monitor 15 is folded in, as shown in FIG. 2, while it is turned toward the photographer, the screen 16a of the fixed monitor 16 becomes concealed, leaving the screen 15a alone in a visible state. In such a situation, the fixed monitor 16 may be made to turn itself off.

It is to be noted that in the replay mode, the monitors 15 and 16 are never viewed by the photographer and the photographic subject together as in (5) and (6) described earlier. Accordingly, it is desirable to judge that one of the monitors is not used for viewing and to turn off the monitor as a power saving measure if the viewing angles of the two monitors 15 and 16 are greatly different in the replay mode.

Such power saving measures may be realized by disposing an angle sensor 61 (see FIG. 14) along the X axis so as to detect the angle of the flip-out monitor 15 relative to the fixed monitor 16. Once the replay mode is selected, the CPU 27 sequentially monitors the output from the angle sensor 61 and turns off one of the monitors if the detected angle is in an angle range over which the two monitors cannot be viewed simultaneously or the two monitors can only be viewed simultaneously with significant difficulty. Either monitor may be turned off in this case. It is desirable to turn off the fixed monitor 16 if the camera body 10 is set down for reproduced image display since the free angle flip-out monitor 15 can be adjusted to the optimal angle for easy viewing. If, on the other hand, a reproduced image is being displayed while the user is holding the camera, the fixed monitor 16 is likely to be easier to view, and accordingly, the flip-out monitor 15 should be turned off. Thus, it is ultimately desirable to allow the photographer to select which monitor is to be turned off.

In addition, while an explanation is given above on an example in which the camera includes a flip-out monitor and a fixed monitor, the present invention may be adopted in a camera having two fixed monitors disposed side by side. It is to be noted however, that, such a configuration is bound to increase the bulk of the camera and the functions (5) and (6) cannot be offered in the camera. Furthermore, the camera does not need to have all the functions (1) to (11) described above and may have only one of these functions.

It is to be noted that the expression "and, at the same time, . . . " used in the explanation of the embodiments refers to simultaneity rather than mere parallelism.

They above described embodiments are examples, and various modifications can be made without departing from the spirit and scope of the invention.

What is claimed is:

1. A digital still camera comprising:

A main body having a front surface and a rear surface;

an image-capturing device having a photographic lens that captures a subject image, the photographic lens of the image-capturing device being arranged at a first position on the front surface of the main body;

a recording device that records the subject image captured by the image-capturing device into an image recording medium;

a reproducing device that reproduces the subject image recorded in the image recording medium;

a first monitor device that is arranged at a second position on the rear surface of the main body, the first monitor device being arranged such that an optical axis of the photographic lens extends between the first position and the second position;

a second monitor device that is independent from the first monitor device, the second monitor device being of a substantially same size and a same type as the first monitor device; and a display control device that displays the subject image captured by the image-capturing device at the first monitor device and displays at the second monitor device a photographic support image, the subject image and the photographic support image being displayed at the same size, wherein:

the display control device displays in real time at the first monitor device subject images repeatedly captured by the image-capturing device and displays at the second monitor device as the photographic support image an enlarged image of part of the subject image displayed at the first monitor device, the subject images repeatedly captured and the enlarged image being simultaneously displayed on the first monitor device and the second monitor device, respectively, when a display screen of the first monitor device and a display screen of the second monitor device are aligned next to one another so as to be viewable simultaneously by a photographer such that the photographer is able to make a comparison by simultaneously viewing the images displayed on the first monitor device and the second monitor device, and the first monitor device and the second monitor device are configured such that the images displayed on the first monitor device and the second monitor device are viewable by the photographer at a distance.

2. The digital still camera according to claim 1, wherein: the enlarged image on display contains a focus area of the subject image displayed at the first monitor device.

3. The digital still camera according to claim 1, wherein: the display control device displays at the first monitor device a frame indicating an area displayed as the enlarged image over the subject image.

4. The digital still camera according to claim 1, further comprising:

a hinge mechanism that rotates one of the first monitor device and the second monitor device to switch between a closed state and an exposed state so that the display screen of the first monitor device and the display screen of the second monitor device are aligned next to one another so as to be viewable simultaneously in the exposed state while the display screen of the second monitor device is concealed in the closed state.

5. The digital camera according to claim 4, wherein: in the closed state, the display screen of the first monitor device and the display screen of the second monitor device face opposite each other so as to conceal each other.

6. The digital still camera according to claim 4, further comprising:

a detection device that detects whether the first monitor device and the second monitor device have an angular relationship that allows an operator to view the first monitor device and the second monitor device simultaneously, wherein:

if detection results provided by the detection device indicate that the first monitor device and the second monitor device do not have the angular relationship which allows the first monitor device and the second monitor device to be viewed simultaneously, the display control device turns off one of the first monitor device and the second monitor device.

7. The digital still camera according to claim 4, wherein: the hinge mechanism further rotates one of the first monitor device and the second monitor device so that the display screen of the first monitor device is turnable toward the photographer and the display screen of the second monitor device is turnable toward a photographic subject, and the display control device displays in real time subject images repeatedly captured by the image-capturing device at the display screen of the first monitor device and also at the display screen of the second monitor device when the display screen of the first monitor device is turned toward the photographer and the display screen of the second monitor device is turned toward the photographic subject.

8. The digital still camera according to claim 4, wherein: the hinge mechanism further rotates one of the first monitor device and the second monitor device so that the display screen of the first monitor device is turnable toward the photographer and the display screen of the second monitor device is turnable toward a photographic subject, and the display control device displays in real time at the display screen of the first monitor device subject images repeatedly captured by the image-capturing device and brings up a countdown display of a self timer at the display screen of the second monitor device when the display screen of the first monitor device is turned toward the photographer and the display screen of the second monitor device is turned toward the photographic subject in a self timer mode.

* * * * *